May 24, 1927.
H. W. SANFORD ET AL
1,630,219
HUB AND JOURNAL BOX,
Filed Dec. 21, 1926   6 Sheets-Sheet 4
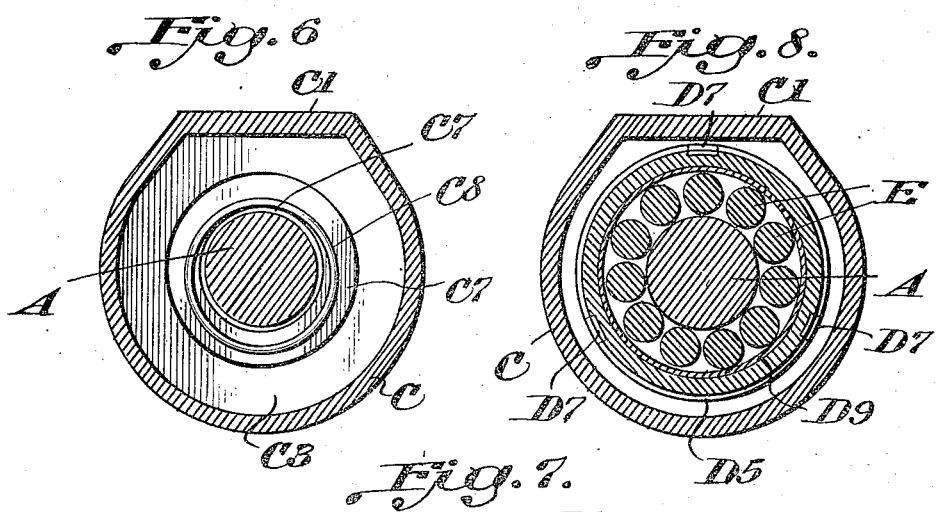
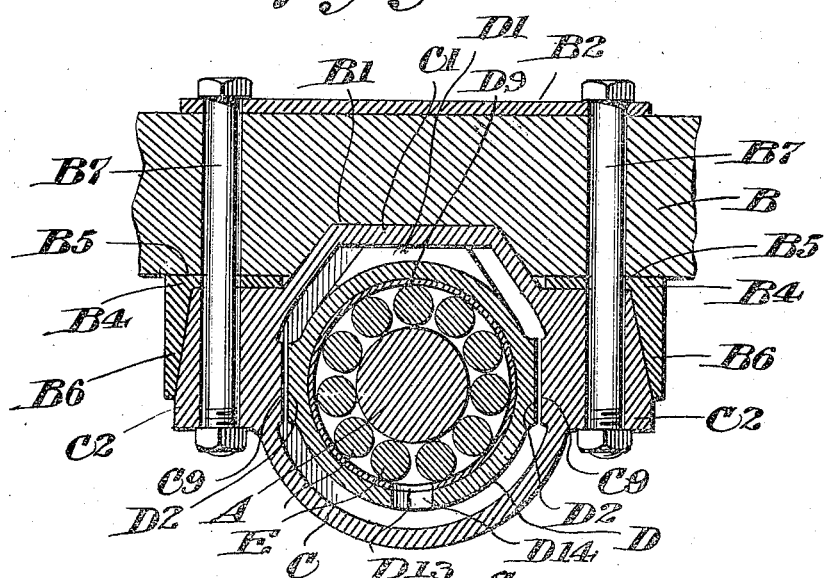
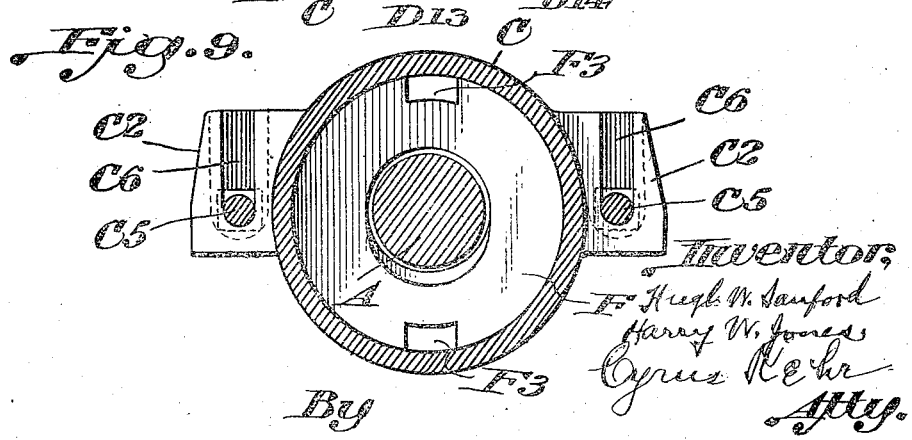

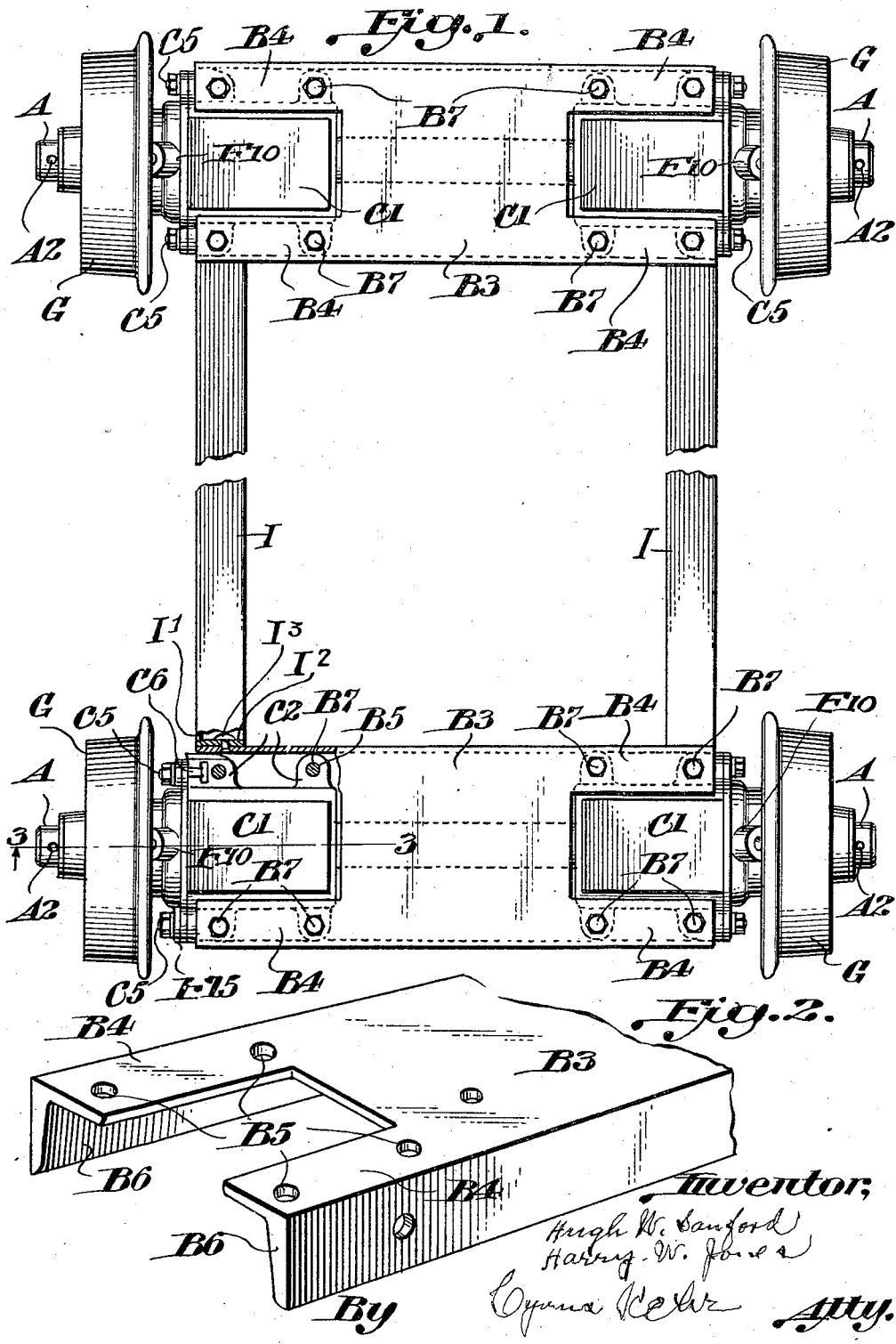

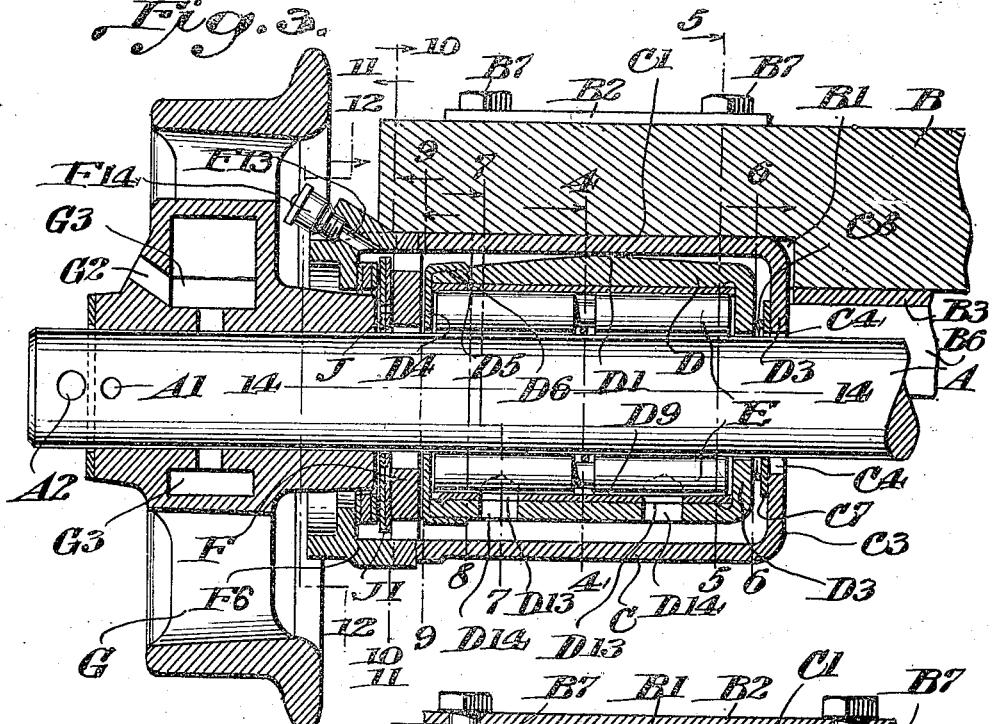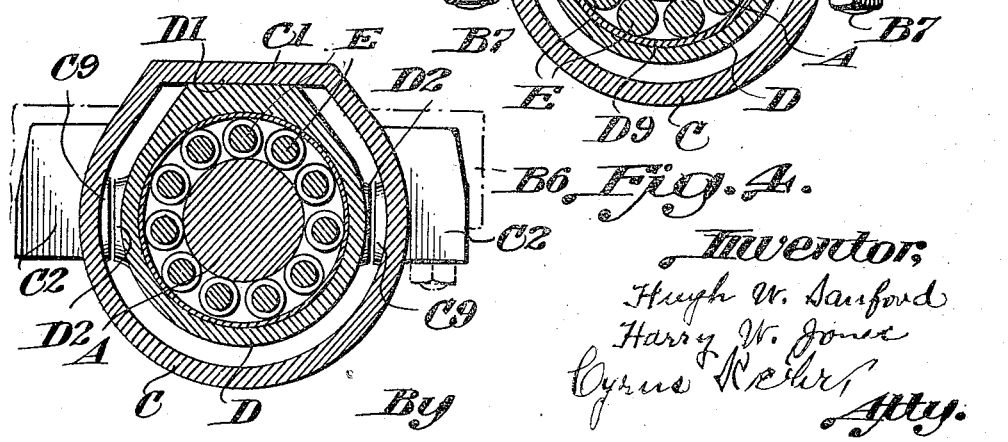

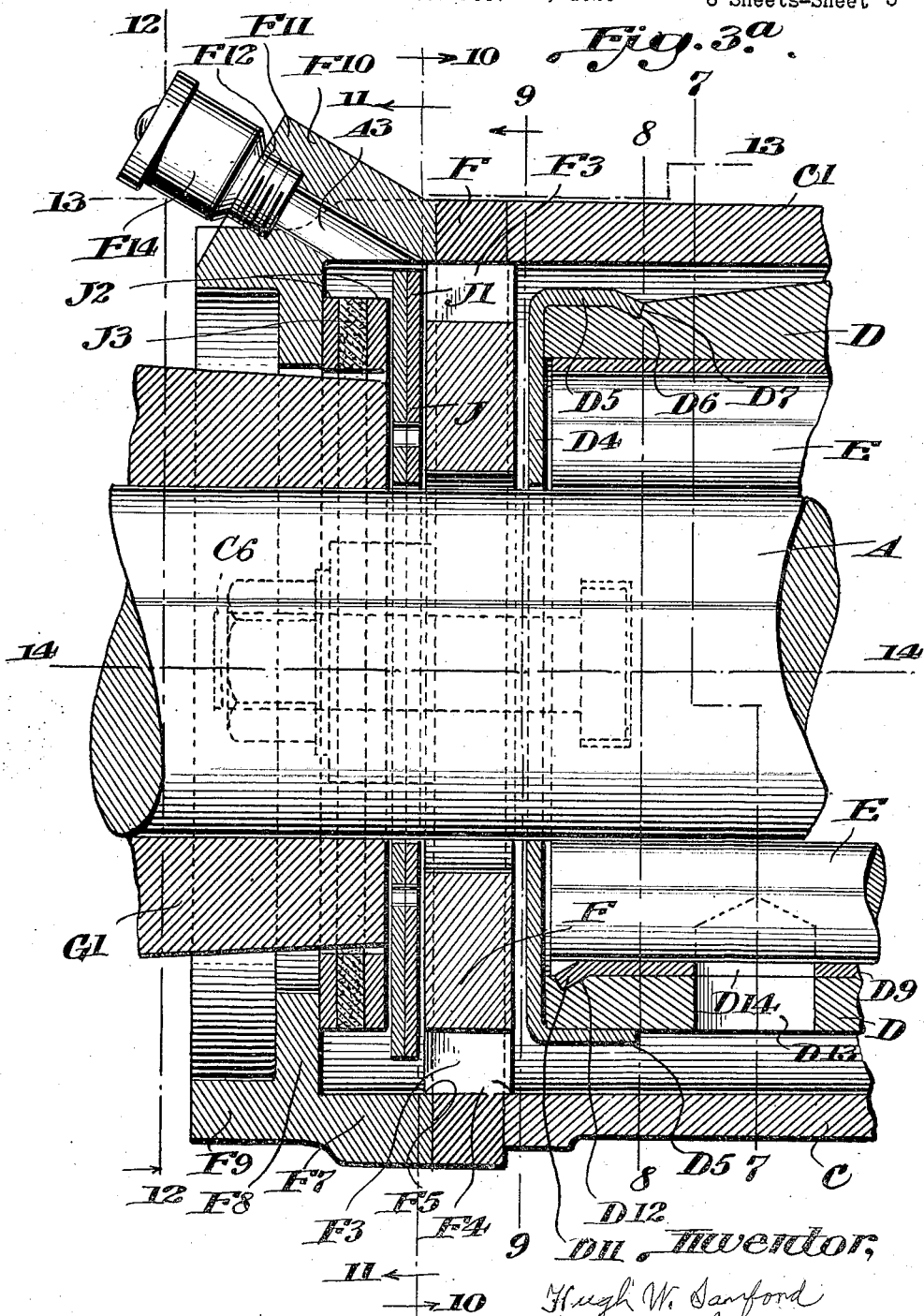

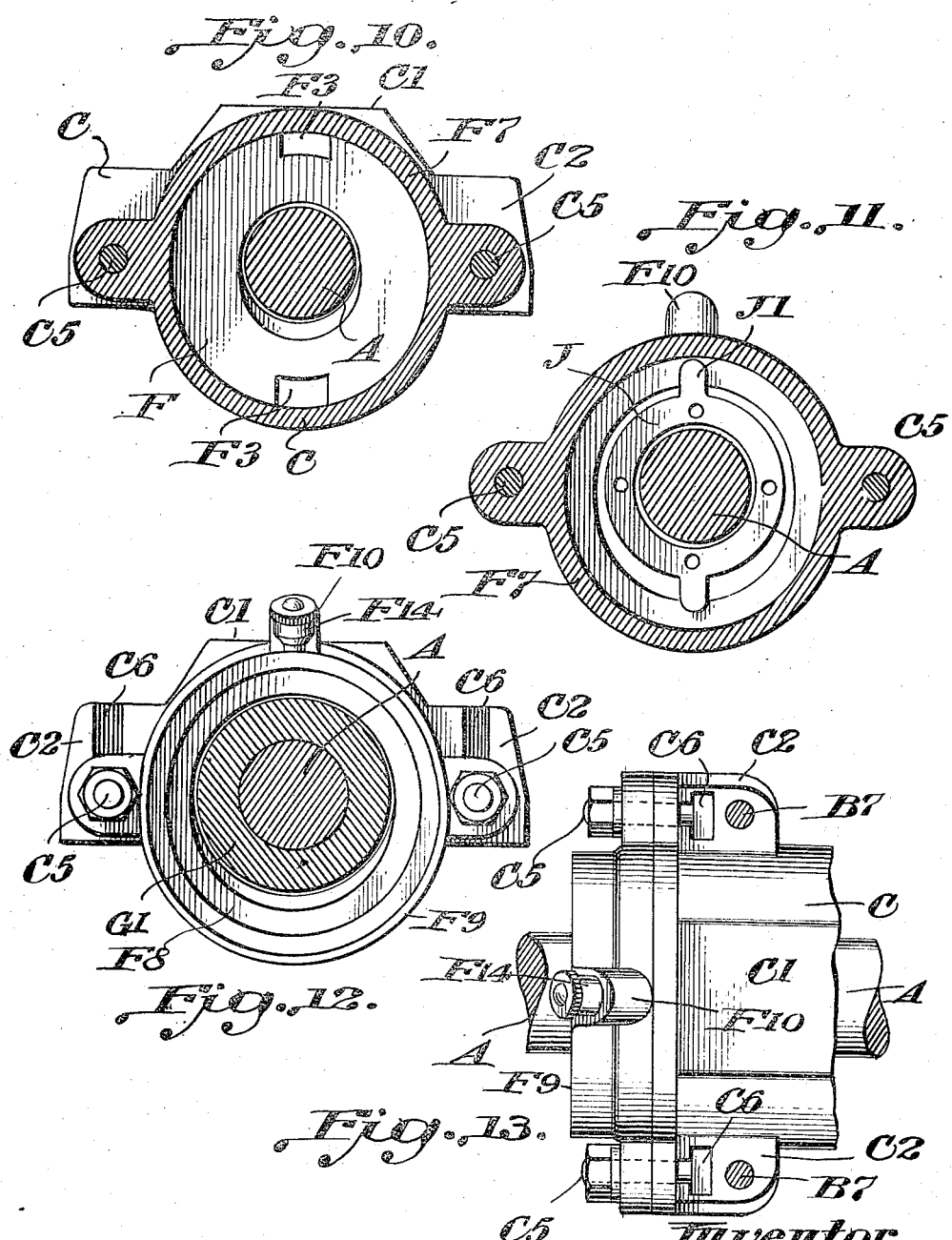

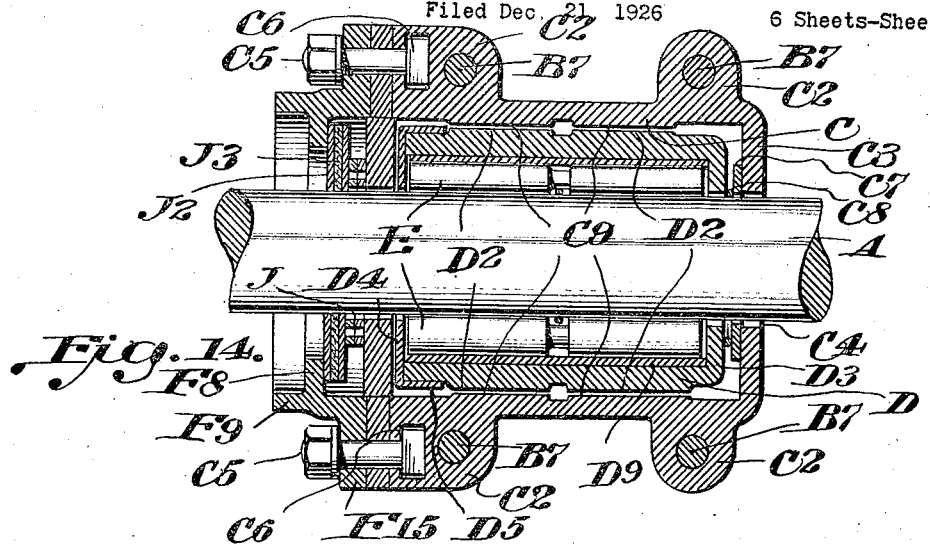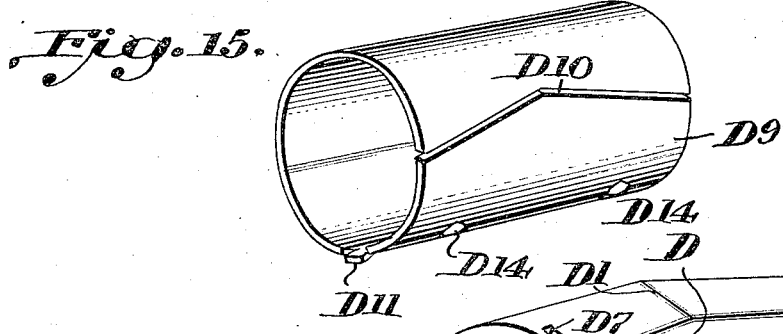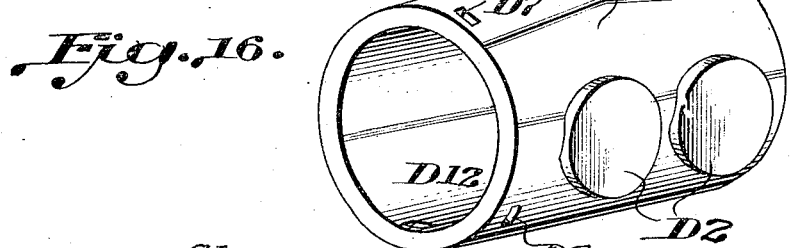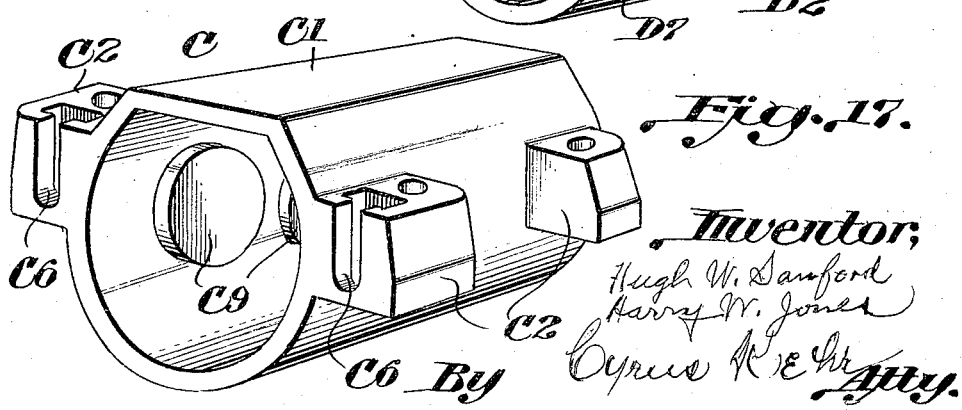

Patented May 24, 1927.

1,630,219

UNITED STATES PATENT OFFICE.

HUGH W. SANFORD AND HARRY W. JONES, OF KNOXVILLE, TENNESSEE, ASSIGNORS TO SANFORD INVESTMENT COMPANY, OF WILMINGTON, DELAWARE, A CORPORATION OF DELAWARE.

HUB AND JOURNAL BOX.

Application filed December 21, 1926. Serial No. 156,146.

This invention relates generally to hubs and axle boxes or bearings and particularly to hubs and axle boxes or bearings in mine cars in which a part or all of the wheels are fixed on the axles and the axles rest in bearings which are associated with pedestals or housings attached to the car body.

The object of this invention is to provide a construction in which the bearing box and the pedestal or housing are associated with each other and with the wheel hub in an effective manner, particularly with reference to making the bearing box free from end thrust and making it "floating" and "self-aligning", and with reference to ample lubrication and exclusion of dirt.

For a similar construction, reference is made to United States Patent, No. 1,602,046, granted to Hugh W. Sanford and Harry W. Jones, October 5, 1926.

In the accompanying drawings,

Fig. 1 is a plan of the under structure of a mine car embodying our improvement;

Fig. 2 is a perspective view of one end of one of the transverse channel plates which are applied to the lower face of the car bottom;

Fig. 3 is a longitudinal upright section on the line 3—3, of Fig. 1, looking in the direction of the arrow;

Fig. 3$^a$ is an enlargement of the middle part of Fig. 3;

Fig. 4 is an upright section on the line, 4—4, of Fig. 3, looking toward the right;

Fig. 5 is an upright section on the line, 5—5, of Fig. 3, looking toward the right;

Fig. 6 is an upright section on the line, 6—6, of Fig. 3, looking toward the right;

Fig. 7 is an upright section on the line, 7—7, of Fig. 3, looking toward the right;

Fig. 8 is an upright section on the line, 8—8, of Fig. 3, looking toward the left;

Fig. 9 is an upright section on the line, 9—9, of Fig. 3, looking toward the left;

Fig. 10 is an upright section on the line, 10, 11—10, 11, of Fig. 3, looking toward the right;

Fig. 11 is an upright section on the line, 10, 11—10, 11, of Fig. 3, looking toward the left;

Fig. 12 is an upright section on the line, 12—12, of Fig. 3, looking toward the right;

Fig. 13 is a horizontal section on the line, 13—13, on the upper part of Fig. 3$^a$, the hub being omitted;

Fig. 14 is a horizontal section on the line, 14—14, of Figs. 3 and 3$^a$;

Fig. 15 is a perspective of the bearing box lining;

Fig. 16 is a perspective of the bearing box;

Fig. 17 is a perspective of the housing.

Referring to said drawings, A, A are axles, G, G, are wheels having hubs, G$^1$, surrounding the axles. The axles extend through the pedestals or housings, C. B$^3$, B$^3$ are two cross plates. Each of these plates is slotted or cut out at each end to leave two arms, B$^4$, in which are holes, B$^5$, and which arms have outer, downward-directed marginal flanges, B$^6$. The space between these arms is made right to bring one of the arms close to each side of the recess, B$^1$, in the floor, B, and the sides of the pedestals, C, and to bring the edge of the plate which is between the arms close to the pedestal. Between the plates, B$^3$, are two connecting members, I, each having its ends rigidly joined to the adjacent flanges, B$^6$, of the plates, B$^3$. In the form shown in the drawings, each of said members is angle-form in cross section and has one of its flanges, I$^1$, directed downward and placed toward the wheels, G. The horizontal flange of each member, I, is cut just long enough to adapt its ends to bear against the adjacent flange, B$^6$, of the adjacent cross plate, while the upright flange, I$^1$, is left long enough to be bent at right angles to the length of the member, I, so as to form a tongue, I$^2$, lying flatwise against the adjacent flange, B$^6$, and secured thereto by a rivet, I$^3$. The two cross members, B$^3$, and the connecting members, I, form a rectangular frame which becomes a part of the truck or under structure of the car.

A pedestal or housing, C, is attached to each end of each cross plate, B$^3$. The cross plates being definitely spaced from each other by the connecting members, I, the pedestals are held in definite relation to each other, the pedestals on one plate, B$^3$, being on the same axial line, and the axial line of the pedestals on one plate being held parallel to the upright plane of the axial line of the pedestals on the other plate.

The part of each axle which extends through the wheel and through the axle bearing or bearing box is cylindrical and of uniform diameter. The entire axle is preferably of this form, in order that it may be made of cold drawn steel, a process which is economical and also affords steel of high quality, whereby an axle of a given diameter is made stronger than can be made of hot rolled commercial steel.

B is the floor of the car body. In the form shown by the drawings, this floor is of wood. Its lower face is recessed at $B^1$ to make room for the pedestal or housing, C, which surrounds the axle bearing or axle box body, D. The upper part of said pedestal has a horizontal face, $C^1$, resting against the wood floor, as shown by Figs. 4, 5, 7, 8 and 9. On the floor above the recess, $B^1$, is a metal washer plate, $B^2$, through which extend four bolts, $B^7$, as will appear further on.

On each side of the pedestal and integral therewith are two lugs, $C^2$, which bear upward and sidewise against the adjacent arms, $B^4$. Bolts, $B^7$, extend downward through the washer plate, $B^2$, the floor, B, the adjacent arm, $B^4$, and the adjacent lug, $C^2$, and bind said parts to each other. The drawings show four such bolts applied to the pedestal.

The pedestal or axle box housing, C, extends entirely around the axle box body. The inner end of the pedestal has an upright wall, $C^3$, which has an oblong orifice, $C^4$, the longer axis of which is upright. The size of this orifice is sufficient to receive the axle, A, and to permit limited up and down movement of the axle in the housing.

The outer end of the housing, the end nearer the wheel, has no upright wall integral with the housing. A removable thrust plate, F, surrounds the axle and extends across the end of the housing and is secured thereto by horizontal bolts, $C^5$, extending through the thrust plate, F, and the cap, $F^6$, described further on, and each of said bolts having its head resting in an upright slot, $C^6$, formed in the adjacent lug, $C^2$, said slot extending upward through the upper face of the lug, $C^2$, and the inner part of the slot being large enough to receive the bolt head and the part of the slot outward from the bolt head being too narrow for the passing of said head. The thrust plate has an oblong opening, $F^2$, through which the axle, A, extends. The long axis of said opening is upright; and said opening is only large enough to receive the axle and permit limited up and down movement of the axle relative to the thrust wall and housing.

Between the inner end of the axle box, D, and the end wall, $C^3$, of the housing, a dust excluding washer plate, $C^7$, surrounds the axle, A. A coiled spring, $C^8$, surrounds the axle between the washer plate and the end wall, $D^3$, and presses the washer plate yieldingly against the wall, $C^3$, of the housing. By this means, the oblong opening, $C^4$, in the end wall, $C^3$, of the housing is substantially sealed against entry of dust from the outside of the housing. This exclusion of dust from the housing is important because the housing is used for holding in its lower part a supply of lubricant.

Between its ends, the upper face of the axle box, D, has a transverse horizontal ridge or summit, $D^1$, resting against the lower face of the upper wall of the pedestal or housing, C. Said ridge or summit is transverse to the bearing box axis and forms a line on which the bearing box may relatively rock on the lower face of the upper wall of the housing, this feature contributing to making this a self-aligning axle bearing, such as is already known in this art. The rocking above mentioned is on a horizontal face. On each side of the bearing box are two upright faces, $D^2$, which bear against corresponding faces, $C^9$, on the inner side faces of the housing, C. These faces, $D^2$ and $C^9$, permit the relative rocking of the axle box above described, but limit rocking of the axle box relative to the housing on an upright axis.

The inner or right-hand end of the bearing box has an upright wall, $D^3$, which fits closely around the axle but permits free turning of the axle and the passage of lubricant.

The opposite or outer end of the axle box has no end wall formed integral with said box. A ring, $D^4$, surrounds the axle and bears against the end of said box. The main part of said ring is in a plane transverse to the axle. Said ring has an outer flange, $D^5$, which extends over a part of the inner face of the box. Parts, $D^6$ of said flange are bent into recesses, $D^7$, formed on the outer face of the axle box. (Figs. 3 and 8). By this means, said ring is removably secured to the axle box. A metal sleeve, $D^9$, forms a lining for the axle box. Said sleeve has a slot, $D^{10}$, extending from end to end of the sleeve. At the outer end of the sleeve, its lower edge is bent downward to form a tongue, $D^{11}$, extending into a recess, $D^{12}$, formed in the inner face of the axle box, whereby the sleeve is held against rotation and against outward movement. Holding the sleeve immovable is for the purpose of keeping the ports, $D^{13}$ and $D^{14}$, in alignment with each other, as next described. Anti-friction rollers, E, occupy the space between the axle, A, and the sleeve, $D^9$. The ends of said rollers almost meet the wall, $D^3$, and the ring, $D^4$. Thus said ends are not engaged and are free from end thrust.

In the lower part of the axle box are two ports, $D^{13}$, and in alignment with each of said ports, the sleeve, $D^9$, has a port, $D^{14}$. Lubricant is to pass upward from the lower part of the housing, C, through said ports to the rollers, E, as will be described further on.

The thrust plate, F, has near its upper edge and near its lower edge a port, $F^3$. The outer edge of the plate, F, is flush with the outer face of the housing, C. The part of the plate, F, which is opposite the wall of the housing, C, is made thinner than the rest of said plate, whereby an annular shoulder, $F^4$, is formed to extend over a part of the inner face of the housing and a similar shoulder, $F^5$, is made along the outer face of the thrust plate. The shoulder, $F^4$, aids in correctly positioning and immovably securing the thrust plate on the end of the housing.

A cap, $F^6$, extends over the outer face of the thrust plate, F, and has a flange, $F^7$, meeting the outer part of the outer face of the thrust plate and extending over the adjacent shoulder, $F^5$. The web or body, $F^8$, of the cap is apertured to receive the adjacent end of the hub, $G^1$, of the wheel, G. To permit up-and-down movement of the hub, this aperture is made oblong, the longer axis being upright. Extending outward from said web is a circumferential flange, $F^9$. On the upper part of the cap is an oblique upward extension, $F^{10}$, having an outward-directed oblique face, $F^{11}$. From said face a cylindrical recess, $F^{12}$, extends obliquely downward and toward the thrust plate, F. From said recess a passage, $F^{13}$, leads toward the thrust plate and through the inner face of the flange, $F^7$, of the cap. Into the recess, $F^{12}$, is to be fitted any suitable device, $F^{14}$, to receive and transmit lubricant into the passage, $F^{13}$. This may be a nipple or screw plug of well-known form for connection with a grease gun.

At each side of the cap, F, is a laterally directed lug, $F^{15}$, which is apertured to receive one of the bolts, $C^5$, each bolt extending also through the adjacent lug, $F^1$, of the thrust plate, F, and the slot, $C^6$, the nut being on the outer end of the bolt. By this means the thrust plate and the cap are well secured to the housing.

In the space between the thrust plate, F, and the adjacent flange, $G^1$, of the hub, two washers, J, surround the axle, A. The diameter of said washers is less than the space enclosed by the cap flange, $F^7$; but the washers have radial wings, $J^1$, which reach approximately to the inner face of said flange.

Between the outer washer, J, and the cap web, $F^8$, two dust excluding rings, $J^2$, surround the hub. Between said rings is a ring, $J^3$, of felt or similar packing material. The rings, $J^2$ and $J^3$, and the washers, J, fill the space between the web, $F^8$, and the thrust plate, F, to such extent only as will allow the washers, J, to at times turn on the axle by frictional engagement with the end of the hub, $G^1$, which hub turns with the wheel, G.

For assembling, the housing is secured by the bolts, $B^7$. Then the axle, A, is put into position. Then the washer, $C^7$, and the spring, $D^8$, and the axle box, D, and the rollers, E, and the ring are put into position. Then the bolts, $C^5$, are put into position on the lugs, $C^2$. Then the thrust plate and the washers, J, $J^1$, $J^2$ and $J^3$, and the cap, F, are placed in position, the bolts, $C^5$, extending through the lugs or ears on the thrust plate and the cap.

A part of the lubricant flowing or driven through the passage $F^{13}$, may go through the upper port, $F^3$, and thence downward to the axle, and a part of said lubricant will fall on the parts of the outer edges of the washers, J, which are between the wings, $J^1$, and flow thence downward along said washers into the space above the lower part of the flange, $F^7$, of the cap, $F^6$, and flow thence through the lower grease port, $F^3$, into the lower part of the housing. Thus the lower part of the housing may be filled with lubricant to any desired extent. From this accumulation of lubricant, there will be flow upward through the ports, $D^{13}$ and $D^{14}$, into the space surrounded by the sleeve lining, $D^9$. Thus the rollers, during their travel around the axle, will receive ample lubricant. This flow of lubricant through the ports, $D^{13}$ and $D^{14}$, will be facilitated by the relative downward movements of the axle in the housing, such downward movement being permitted by the oblong openings in the thrust plate and in the inner end wall, $C^3$, of the housing, as already described, the downward movement of the axle and the axle boxing tending to force the lubricant upward through said ports.

When the hub, $G^1$, presses toward the thrust plate, $F^3$, and rotates, frictional engagement made between the end of the hub and the adjacent washer, J, causes partial or complete rotation of said washers. Repetitions of this action will cause more and more partial or complete rotations of said washers, whereby the wings, $J^1$, on said washers are caused to carry lubricant upward above the axle and to the upper part of the interior of the cap. Thus flow through the upper port, $F^3$, may again occur.

Ordinarily the wheel, G, will be made fast on the axle by means of a pin extending through the axle and the wheel hub at $A^1$. If the wheel is to be "loose", the pin is to be removed from $A^1$ and the same or another pin inserted through the axle at $A^2$ for holding the wheel against outward movement on the axle while the wheel is free to turn on the axle. When the wheel is loose, lubricant is to be inserted through the port, G², into the lubricant passage, G³.

When the car body shifts toward the left, the end thrust is taken by the thrust plate, F, and the washers, J, and the wheel hub, G¹. Thrust by movement of the car body in the opposite direction is taken by said thrust plate and washers and hub at the other end of the axle.

The pedestal or housing, C, and the thrust plate, F, and the cap, F⁶, may be regarded as together constituting a housing structure which completely surrounds the axle box and through which the axle extends and which is adapted to exclude dust and to serve as a lubricant reservoir, lubricant being at suitable times forced from a grease gun through the screw plug, F¹⁴.

We claim as our invention,

1. In a railway car, the combination with an axle and a wheel surrounding the axle, of an axle box surrounding the axle, a housing structure surrounding the axle box and closed for retaining lubricant and excluding dirt and comprising a thrust plate and a cap between which is an upright annular recess communicating at its lower part with the lower part of the interior of the portion of the housing in which the axle box is located and said cap having a lubricant inlet, and means in said annular recess for carrying lubricant upward from the lower part of said recess, substantially as described.

2. In a railway car, the combination with an axle and a wheel surrounding the axle, of an axle box surrounding the axle, a housing structure surrounding the axle box and closed for retaining lubricant and excluding dirt and comprising a thrust plate and a cap between which is an upright annular recess communicating at its lower part with the lower part of the interior of the portion of the housing in which the axle box is located, means in said annular recess for carrying lubricant upward from the lower part of said recess, and a lubricant-conducting passage extending through said cap, substantially as described.

3. In a railway car, the combination with an axle and a wheel surrounding the axle, of an axle box surrounding the axle, a housing structure surrounding the axle box and closed for retaining lubricant and excluding dirt and comprising a thrust plate and a cap between which is an upright annular recess communicating at its lower part with the lower part of the interior of the portion of the housing in which the axle box is located, means in said annular recess for carrying lubricant upward from the lower part of said recess, a lubricant-conducting passage extending through said cap and a lubricant receiving device seated on said passage, substantially as described.

4. In a railway car, the combination with an axle and a wheel surrounding the axle, of an axle box surrounding the axle, a housing structure surrounding the axle box and closed at its inner end for retaining lubricant and excluding dirt, and comprising a thrust plate and a cap both surrounding the axle and extending over the outer end of the housing structure, dust excluding means between said plate and said cap, and a lubricant-conducting passage extending through said cap, substantially as described.

5. In a railway car, the combination with an axle and a wheel surrounding the axle, of an axle box surrounding the axle, a housing structure surrounding the axle box and the axle and closed for retaining lubricant and excluding dirt, a thrust plate and a cap shaped to form a space between them which communicates at its lower part with the interior of the housing, means in said space for carrying lubricant upward, means in said space for excluding dirt, a lubricant-conducting passage extending through the cap, and a lubricant receiving device on the outer end of said passage, substantially as described.

6. In a railway car, the combination with an axle and a wheel surrounding the axle, of an axle box surrounding the axle and having a lower lubricant port, a housing structure secured to the car body and surrounding the axle box and the axle and closed for retaining lubricant and excluding dirt, said structure including a thrust wall extending around the axle and over and secured to one end of the housing body, and a flange cap extending over the thrust plate and extending around the wheel hub, the housing having a passage for the admission of lubricant into the housing, substantially as described.

7. In a railway car, the combination with an axle and a wheel surrounding the axle, of an axle box surrounding the axle, a housing structure secured to the car body and surrounding the axle box and the axle and closed for retaining lubricant and excluding dirt, said structure including a thrust wall extending around the axle and over and secured to one end of the housing body, and a flanged cap extending over the thrust plate and extending around the wheel hub and the thrust plate and the cap being shaped to form an annular recess communicating with the lower part of the interior of the housing, and washers in said annular recess for carrying lubricant upward from the lower part of said recess, substantially as described.

8. In a railway car, the combination with an axle and wheels surrounding the axle, of an axle box surrounding the axle, a housing body secured to the car and surrounding the axle box and the axle and closed below for retaining lubricant and excluding dirt, a thrust wall extending around the axle and over one end of the housing body and secured to the housing body, a cap having a flange extending horizontally over the wheel hub and having an annular inward-directed flange for the forming of an annular recess between the cap and the thrust plate and communicating with the lower part of the interior of the housing, washers in said annular recess for carrying lubricant upward from the lower part of said recess, and means for admitting lubricant into the annular recess, substantially as described.

9. In a railway car, the combination with an axle and wheels surrounding the axle, of an axle box surrounding the axle, a housing body secured to the car and surrounding the axle box and the axle and closed below for retaining lubricant and excluding dirt, a thrust wall extending around the axle and over one end of the housing body and secured to the housing body, a cap extending over the thrust wall and flanged to form between the cap and the thrust wall an annular recess communicating with the lower part of the interior of the housing, and washers in said annular recess for carrying lubricant upward from the lower part of said recess, substantially as described.

10. In a railway car, the combination with an axle and a wheel surrounding the axle, of an axle box surrounding the axle and having in its lower part a lubricant port, a housing structure surrounding the axle box and surrounding the axle at each end of the axle box and means on each end of the housing structure for excluding dirt and the housing structure having an annular recess between the wheel hub and the axle box, the lower part of said recess communicating with the lower part of the housing structure which contains the axle box, means in the annular recess for carrying lubricant upward in said annular recess, and means for admitting lubricant into the housing, substantially as described.

11. In a railway car, the combination with an axle and a wheel surrounding the axle, of an axle box surrounding the axle and having in its lower part a lubricant port, a housing structure surrounding the axle box and surrounding the axle at each end of the axle box and surrounding the adjacent end of the wheel hub, means on each end of the housing structure for excluding dirt and the housing structure having an annular recess between the wheel hub and the axle box, the lower part of said recess communicating with the lower part of the housing structure which contains the axle box, means in the annular recess for carrying lubricant upward in said annular recess, and means for admitting lubricant into the housing, substantially as described.

12. In a railway car, the combination with an axle and a wheel surrounding the axle, of an axle box surrounding the axle, a housing structure surrounding the axle box and closed at its inner end for retaining lubricant and excluding dirt, and having lateral ears, a thrust plate and a cap surrounding the axle and extending over the outer end of the housing body and over said ears, means for binding said plate and said cap to said ears, and said housing having a passage for the insertion of lubricant into the housing, substantially as described.

13. In a railway car, the combination with an axle and a wheel surrounding the axle, of an axle box surrounding the axle, a housing structure surrounding the axle box and closed at its inner end for retaining lubricant and excluding dirt, and having lateral ears, a thrust plate and a cap surrounding the axle and extending over the outer end of the housing body and over said ears, bolts for binding said plate and said cap to said ears, and said housing having a passage for the insertion of lubricant into the housing, substantially as described.

14. In a railway car, the combination with an axle and a wheel surrounding the axle, of an axle box surrounding the axle, a housing structure surrounding the axle box and closed at its inner end for retaining lubricant and excluding dirt, and having lateral slotted ears, a thrust plate and a cap surrounding the axle and extending over the outer end of the housing body and over said ears, bolts for engaging in said slots and binding said plate and said cap, and said housing having a passage for the insertion of lubricant into the housing, substantially as described.

15. In a railway car, the combination with an axle and a wheel surrounding the axle, of an axle box surrounding the axle and having an upper lubricant port, a housing structure surrounding the axle box and comprising a thrust plate and a cap, the thrust plate having at its lower part a port, and the housing having a passage for the admission of lubricant, substantially as described.

16. In a railway car, the combination with an axle and a wheel surrounding the axle, of an axle box surrounding the axle and having a lubricant port, a housing structure surrounding the axle box and comprising a thrust plate and a cap, said thrust plate having an upper and a lower lubricant port, and said housing having a passage for the admission of lubricant adjacent said upper port, substantially as described.

17. In a railway car, the combination with an axle and a wheel surrounding the axle, of an axle box surrounding the axle, a housing surrounding the axle box and closed for retaining lubricant and excluding dirt and comprising a flat thrust plate and a flanged cap, between which plate and cap is an upright annular recess communicating at its lower part with the lower part of the interior of the portion of the housing in which the axle box is located and the cap having an upper lubricant inlet, and means in said annular recess for carrying lubricant upward from the lower part of said recess, substantially as described.

18. In a railway car, the combination with an axle and a wheel surrounding the axle, of an axle box surrounding the axle and having in its lower part a lubricant port, a lining within the axle box and having a lubricant port registering with the port in the axle box, and said lining being secured to prevent movement within the axle box, a housing surrounding the axle box and having a port for the delivery of lubricant into the housing, a thrust wall surrounding the axle and extending over the outer end of the housing body, and said housing having a passage for the admission of lubricant into the housing to accumulate in the lower part of the housing, substantially as described.

19. In a railway car, the combination with an axle and a wheel surrounding the axle, of an axle box surrounding the axle, a housing structure surrounding the axle box and closed for retaining lubricant and comprising a thrust plate and a cap between which is an upright annular recess communicating at its lower part with the lower part of the interior of the portion of the housing in which the axle box is located and the cap having a lubricant receiving port, and means in said annular recess for carrying lubricant upward from the lower part of said recess, substantially as described.

20. In a railway car, the combination with an axle and a wheel surrounding the axle, of an axle box surrounding the axle, a housing structure surrounding the axle box and closed for retaining lubricant and comprising a thrust plate and a cap between which is an upright annular recess communicating at its lower part with the lower part of the interior of the portion of the housing in which the axle box is located, means in said annular recess for carrying lubricant upward from the lower part of said recess, and a lubricant-conducting passage extending through said cap, substantially as described.

21. In a railway car, the combination with an axle and a wheel surrounding the axle, of an axle box surrounding the axle, a housing structure surrounding the axle box and closed for retaining lubricant and comprising a thrust plate and a cap between which is an upright annular recess communicating at its lower part with the lower part of the interior of the portion of the housing in which the axle box is located, means in said annular recess for carrying lubricant upward from the lower part of said recess, a lubricant-conducting passage extending through said cap, and a lubricant receiving device seated on said passage, substantially as described.

22. In a railway car, the combination with an axle and a wheel surrounding the axle, of an axle box surrounding the axle and being apertured for admission of lubricant into said box from the below-mentioned housing, a housing surrounding the axle box and the axle and movable up and down relative to the axle box and adapted to contain lubricant below the axle box and drive said lubricant upward through the axle box aperture during relative upward movement of the housing, substantially as described.

23. In a railway car, the combination with an axle and a wheel surrounding the axle, of an axle box surrounding the axle and having its lower horizontal wall apertured for admission of lubricant into said box from the below-mentioned housing, a housing surrounding the axle box and the axle and movable up and down relative to the axle box and adapted to contain lubricant below the axle box and drive said lubricant upward through the axle box aperture during relative upward movement of the housing, substantially as described.

In testimony whereof I have signed my name at Knoxville, Tennessee, this 9th day of December, in the year one thousand nine hundred and twenty-six.

HUGH W. SANFORD.

In testimony whereof I have signed my name at St. Louis, Missouri, this 13th day of December, 1926.

HARRY W. JONES.